Feb. 26, 1957  J. F. STEPHENS  2,783,174
PROCESS FOR PRODUCING FIBROUS TUBES
Filed May 20, 1953
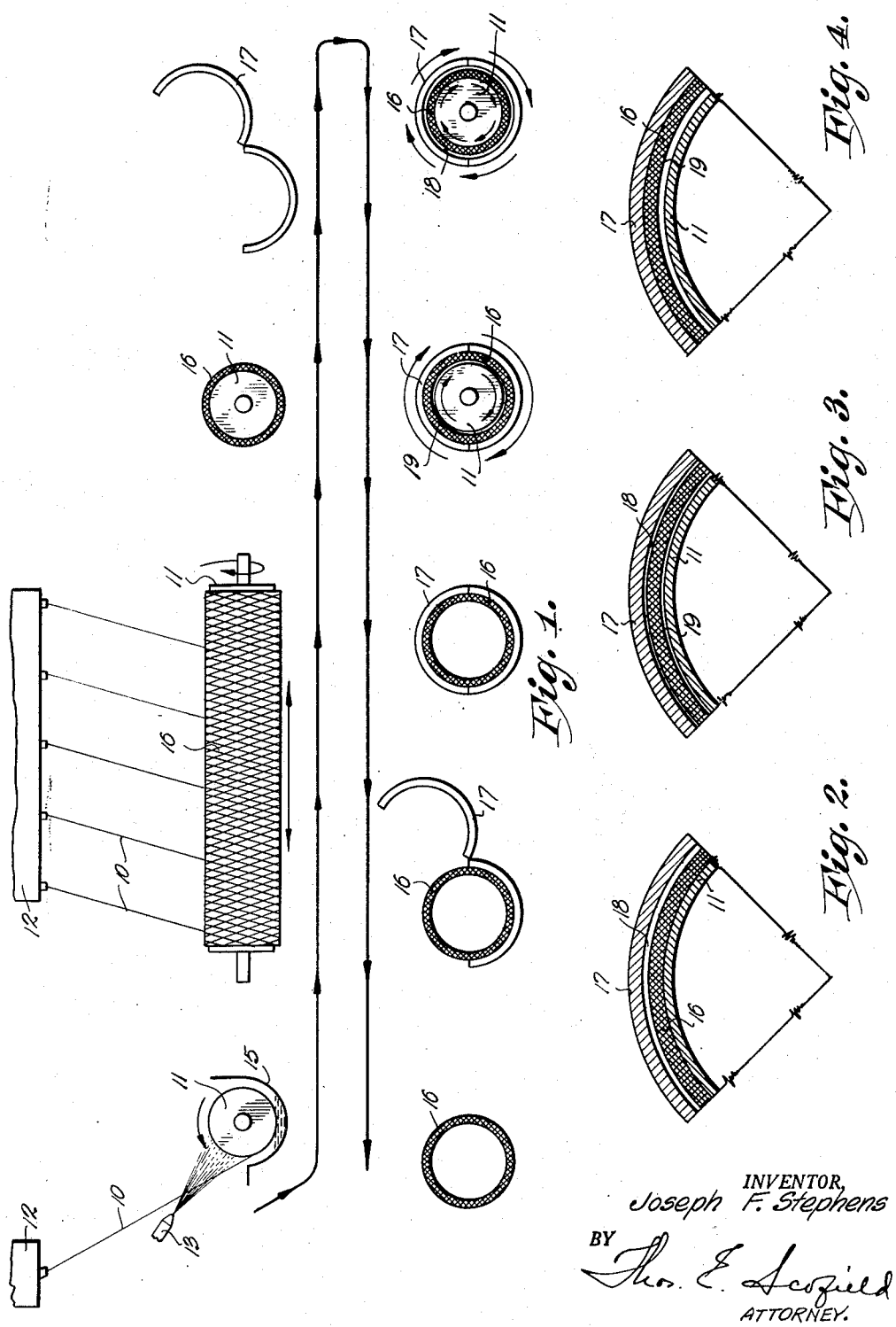
INVENTOR,
Joseph F. Stephens
BY
ATTORNEY.

United States Patent Office 2,783,174
Patented Feb. 26, 1957

2,783,174
PROCESS FOR PRODUCING FIBROUS TUBES

Joseph F. Stephens, Kansas City, Mo., assignor to Minnesota Mining and Manufacturing Company, a corporation of Delaware Application May 20, 1953, Serial No. 356,273

4 Claims. (Cl. 154—83)

This invention relates to reinforced plastic pipes or conduits, and refers more particularly to an improved method of manufacture for such articles.

It is a conventional practice in the manufacture of plastic reinforced articles of the nature of pipes, conduits and other hollow, generally cylindrical objects, to apply the reinforcing material, whether it be paper, fibrous mat or felt, or continuous filaments, strands of filaments, yarns, cords or the like, to a mandrel so that the reinforcing material can be snugly or tightly wound around the periphery of the mandrel in superimposed layers to the desired thickness. During the build-up, or winding, the plastic resin is added thereto, either by spraying or coating the layers of the build-up or by passing the material through a bath of the resin prior to its application to the mandrel.

After the build-up has been effected, the common practice has been to heat-cure the resin bearing object to a solid state while still carried by the mandrel. The surface of the mandrel thus serves as a mold or die which gives to the inner wall of the article its desired final diameter and surface properties. It will be evident that any irregularities or imperfections in the mandrel surface are reflected in the inside wall of the pipe. Further, even where the mandrel is provided with a smoothly machined surface, the adhesion of the resin thereto makes it difficult to withdraw the mandrel from the cured article. In the case of pipe, it has been attempted to remedy this difficulty by using a slightly tapered mandrel which theoretically facilitates its removal. However, the taper is reflected in the final article, causing the diameter at one end to be slightly greater than at the other, and in the abutting of sections of the pipe to form a continuous line, the variations in diameter of adjacent pipe ends results in a rough flow passageway which creates a great deal of turbulence.

It has also been proposed in the case of plastic reinforced pipe to remove the build-up of resin and reinforcing material from the mandrel while still in a partially uncured state, and thereafter place same in an annular centrifuging shell having openings along its inner surface through which additional liquid resin can be flowed to the annulus of the shell. The shell is rotated at high speeds to centrifuge the product, and at the same time a liquid resin is introduced to the interior of the shell and thence through the openings into the annulus where it spreads uniformly around the inside wall of the pipe. Due to the centrifuging, the resin is distributed concentrically around the shell and forms an inside surface which is of uniform gauge throughout the length of the pipe. However, considerable difficulty has been met in the handling of the low strength preforms during their transfer from the mandrel to the centrifuging shell since they tend to collapse or wrinkle.

It is a primary object of the present invention to eliminate or overcome the above difficulties by providing a process for the manufacture of hollow articles of the nature described in which the article is cured to its final state while still surrounding the mandrel, but with its inner free face from contact with the mandrel so that upon completion of the curing operation, the mandrel can be withdrawn from the article with ease.

Another object is to provide a process in which the binder present in the uncured build-up tends to reorient itself throughout the mat after winding to provide uniformity of distribution throughout the build-up. In this manner, the build-up is given a uniform construction in which the reinforcing material is securely bonded into a closely knit, nonporous structure in which resistance to breakage from bending or excessive internal pressures is at the optimum.

A further object is to provide a process for manufacture of articles of the character described in which the binder to be incorporated in the build-up can be applied in separate steps while the article is still on the mandrel. This eliminates the necessity of handling the article while still in a weak or uncured state.

Other and further objects, together with the features of novelty appurtenant thereto, will appear in the course of the following description.

In the accompanying drawing, which forms a part of the specification and is to be read in conjunction therewith, and in which like reference numerals are used to identify like parts in the various views:

Fig. 1 is a diagrammatic illustration of the successive steps to be followed in practicing my invention in the manufacture of plastic reinforced pipes or tubes in which continuous filaments or strands provide the reinforcing material;

Fig. 2 is an enlarged cross-sectional view through one quadrant of the mandrel, pipe and shell prior to centrifuging;

Fig. 3 is an enlarged cross-sectional view through the same quadrant showing the relative position of the elements at an intermediate point during centrifuging, and Fig. 4 is an enlarged cross-sectional view through the same quadrant after the centrifuging action has been completed.

Referring to the drawing, in Fig. 1 I have illustrated schematically a typical process for the manufacture of reinforced plastic pipes in which the build-up on the mandrel comprises continuous filaments 10 which are wound helically in superimposed layers about a longitudinally oscillating, rotary mandrel 11. The filament source is indicated at 12, and may be spools of glass yarn or continuous fibres. Nozzles 13 are provided for spraying a suitable thermosetting resin or other binder material onto the filaments 10 and the layers being built up on mandrel 11, and a resin collector or trough for accumulating the excess binder is shown at 15.

It will be understood that in the process to be hereinafter described, the composition of the pipe is not limited to filaments alone, but may include instead fibrous mats, paper, strips of woven material or full length woven sheets, or any other material which is susceptible of being wound about a mandrel in superimposed layers and which is capable of being bonded together by a suitable adhesive to form a unitary structure. Also, the method of application of the binder is not limited to spray nozzles, but may include drawing the reinforcing material through a resin bath prior to winding or any other method by which the binder is incorporated within the layers of material being applied to the mandrel.

Following the application to the mandrel 11 of the binder and reinforcing material to form a build-up 16 of desired dimensions, the rotation of the mandrel is arrested, and the mandrel, with the build-up 16 intact thereon, is removed from the wind-up mechanism (not shown) and placed in a hollow, cylindrical mold or shell 17 with its axis concentric with the axis of the shell.

Preferably mold 17 is formed of opposed, longitudinal half sections which are hinged together along one edge and which can be closed about the mandrel and build-up and locked together. The ends of shell 17 are also preferably closed by means of end plates, or the like, so that the mandrel 11 and build-up 16 are fully enclosed therein.

It will be understood that any suitable arrangement can be employed for properly positioning the shell with respect to the mandrel; for example, the use of centering spiders at each end, or by providing solid, disk-like end plates having central openings through which the opposite ends of the mandrel shaft extend in a close fit.

The inside diameter of shell 17 is of critical importance. As will be noted from Fig. 2, the inside diameter of shell 17 is slightly greater than the outside diameter of the build-up 16 so that there is provided between the adjacent surfaces thereof an annular cavity 18. The radial dimension of cavity 18 need only be sufficient to insure that the mold or shell 17 will be free from contact with the outside surface of the build-up 16 when placed therearound, but it will be evident that the spacing can be increased slightly if desired.

After the mold 17 has been installed on the mandrel, the assembly of mold, mandrel and build-up is then placed in a spinner of any suitable design, and rotated at high speed about the common axis. Due to the centrifugal force created by the rotation of the mandrel and build-up, and the slight stretch of which the yet uncured build-up is capable, the build-up moves radially outward and tends to fill cavity 18 while at the same time causing a small cavity 19 to appear between the surface of the mandrel 11 and the inside wall of the build-up 16. The uniformity of the centrifugal force insures that this breaking away of the build-up from the mandrel will take place throughout the full circumference, and that adhesion to the mandrel will be eliminated. As the spinning continues, the build-up finally comes to rest against the inside surface of the mold 17, and the cavity 19 around the face of the mandrel assumes substantially the same thickness as the original cavity 18. (See Fig. 4.)

During the spinning action, and while the build-up 16 is being maintained in its outermost position as illustrated in Fig. 4, heat is applied to cure the resin and set the build-up in its final state. The heat may be applied directly to the mold itself, or where a hollow mandrel is used, to the interior of the mandrel, or both. The heat is preferably in the form of heated air or steam which is brought in contact with the surfaces of the mold and for mandrel, but it will be evident that a variety of methods can be used.

Once the resin in the build-up has set, the assembly is cooled, and the mandrel 16 can be withdrawn freely from the inside of the build-up. The halves of the shell 17 are then separated, and the article removed in its final form. The centrifuging action of the spinning during curing results in an even thickness for the article, and tends to plaster the build-up smoothly around the interior of the shell to provide a smooth outer surface for the final article as well as a uniform diameter throughout its length. Moreover, any excess resin which has migrated radially toward the inside wall of the build-up under the squeezing action occurring during winding tends to redistribute itself outwardly through the build-up during the spinning action, and a more uniform structure is obtained.

It has been discovered that additional benefits are realized with my process when an added amount of binder material is placed in the shell prior to the placing therein of the mandrel and build-up. Preferably this should be sufficient resin to submerge the build-up during spinning, but not enough to completely fill the cavity 19 so that after the resin has set, the mandrel will still be free for withdrawal. Under the influence of the centrifugal force created during the spinning action, the added resin distributes uniformly around the inside of the shell and migrates into and through the yet porous, uncured build-up and causes a thin, glassy layer of resin to be formed on the inside of the build-up. When cured, the resin in this inner layer forms the inside wall of the pipe, resulting in a surface which is smooth and unmarred by any irregularities or imperfections which might otherwise be present.

A further modification of the process, which has advantages in certain application, is to apply during the winding operation only sufficient binder to give the build-up the necessary integrity for holding it in place on the the mandrel, and to incorporate the remaining resin required as a part of the spinning operation in the manner described above. The porosity of the uncured build-up permits migration of the binder throughout the fibrous structure and insures of its relatively even distribution therethrough. In pipes formed according to this process, the final product is of uniform diameter both inside and out, and is provided with smooth surfaces which add materially to its usefulness in flow conduits.

From the foregoing, it will be seen that I have provided a process which is well adapted to attain all of the ends and objects hereinabove set forth together with other advantages which are obvious and inherent thereto. By taking advantage of the inherent ability of the uncured build-up to stretch under the influence of centrifugal force, and by confining the total enlargement to slight dimensions, and by curing the build-up while in its enlarged state, the problems heretofore present in the use of mandrels have been wholly eliminated. Further, the resulting structure is improved over those previously known in both strength and surface qualities.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In the process of forming composite fibrous tubes wherein a binding agent is applied to a fibrous material and the fibrous material is wound tightly about a cylindrical mandrel in superimposed layers to form a tube in place on the mandrel, the improvement which comprises the steps of rotating the mandrel and tube about their common axis at a speed sufficient to cause the inner surface of the tube to separate by centrifugal action from the surface of the mandrel to produce an annular cavity between said surfaces, rotatably supporting at the same speed the exterior surface of the tube following separation of the inner surface of the tube from the surface of said mandrel to maintain the tube wall in substantially circular form but separated from said mandrel, and while maintaining said tube in separated relation with said mandrel curing the binding agent to set the tube in its final form.

2. The process of claim 1 wherein the binding agent comprises a thermosetting material, and wherein curing is accomplished by applying heat to the outer surface of the tube.

3. The process of claim 1 wherein the binding agent comprises a thermosetting material, and wherein curing is accomplished by applying heat both to the outer surface of the tube and inner surface of the mandrel.

4. In the process for forming composite fibrous tubes wherein a binding agent is applied to a fibrous material and the fibrous material is wound tightly about a cylindrical mandrel in superimposed layers to form a tube in place on the mandrel, the improvement which comprises the steps of rotating the mandrel and tube at a speed sufficient to cause the inner surface of the tube to separate due to centrifugal force from the surface of the mandrel to produce an annular cavity between said surfaces, rotatably supporting at the same speed the exterior surface of said tube following separation of the inner surface of the tube from the surface of said mandrel to maintain the tube wall in substantially circular form but separated from said mandrel, applying additional binding agent by centrifugal action to the inner surface of said tube, and while maintaining said additional agent in its centrifuged position curing said binding agent to set the tube in its final form.

References Cited in the file of this patent

UNITED STATES PATENTS

| | | |
|---|---|---|
| 1,668,763 | Dickson | May 8, 1928 |
| 2,518,504 | Stott | Aug. 15, 1950 |
| 2,614,058 | Francis | Oct. 14, 1952 |
| 2,633,605 | Brucker | Apr. 7, 1953 |